US005580369A

United States Patent [19]

Belding et al.

[11] Patent Number: 5,580,369
[45] Date of Patent: Dec. 3, 1996

[54] ADSORPTION AIR CONDITIONING SYSTEM

[75] Inventors: William A. Belding, Danville, Calif.; William D. Holeman, Baton Rouge, La.; Zalman Lavan, Evanston, Ill.; Roger L. Jones, Milton, N.H.

[73] Assignee: LaRoche Industries, Inc., Baton Rouge, La.

[21] Appl. No.: 380,342

[22] Filed: Jan. 30, 1995

[51] Int. Cl.$^6$ ........................... B01D 53/06
[52] U.S. Cl. .............. 96/125; 96/135; 96/150; 96/153; 162/164.2; 162/181.6
[58] Field of Search ............. 95/117, 118; 96/123, 96/125–128, 135, 150, 153, 154; 162/164.2, 181.6

[56] References Cited

U.S. PATENT DOCUMENTS

| | | | |
|---|---|---|---|
| 2,233,189 | 2/1941 | Altenkirch | 62/139 |
| 2,790,505 | 4/1957 | Dow | 183/4.3 |
| 2,792,071 | 5/1957 | Pennington | 183/2 |
| 2,925,880 | 2/1960 | Munters | 183/4.6 |
| 3,009,540 | 11/1961 | Munters | 183/114.2 |
| 3,024,867 | 3/1962 | Milton | 183/114.2 |
| 3,144,901 | 8/1964 | Meek | 165/6 |
| 3,176,444 | 4/1965 | Kiyonaga | 55/26 |
| 3,176,446 | 4/1965 | Siggelin | 55/189 |
| 3,230,689 | 1/1966 | Hussmann | 55/28 |
| 3,251,402 | 5/1966 | Glay | 165/7 |
| 3,266,973 | 8/1966 | Crowley | 162/164 |
| 3,274,751 | 9/1966 | Skarstrom | 55/33 |
| 3,293,192 | 12/1966 | Maher et al. | 252/430 |
| 3,323,288 | 6/1967 | Cheung et al. | 55/58 |
| 3,382,141 | 5/1968 | Arledter et al. | 162/181.6 X |
| 3,402,996 | 9/1968 | Maher et al. | 23/112 |
| 3,405,507 | 10/1968 | Spencer et al. | 55/62 |
| 3,464,186 | 9/1969 | Hankison et al. | 55/163 |
| 3,531,916 | 10/1970 | Kulperger et al. | 55/33 |
| 3,542,525 | 11/1970 | Pigford et al. | 23/311 |
| 3,555,787 | 1/1971 | Lustig | 55/179 |
| 3,664,095 | 5/1972 | Asker et al. | 55/387 |
| 3,674,429 | 7/1972 | Collins | 23/159 |
| 3,694,202 | 9/1972 | Sawyer, Jr. et al. | 162/181.6 X |
| 3,712,027 | 1/1973 | Hasz | 55/33 |
| 3,800,515 | 4/1974 | Asker et al. | 162/181.6 X |
| 3,807,149 | 4/1974 | Norback | 55/388 |
| 3,844,737 | 10/1974 | Macriss et al. | 55/34 |
| 3,866,428 | 2/1975 | Simonet et al. | 62/18 |
| 4,012,206 | 3/1977 | Macriss et al. | 55/54 |
| 4,030,896 | 6/1977 | Wimber et al. | 55/33 |
| 4,064,304 | 12/1977 | Fujita et al. | 162/181.6 X |
| 4,093,435 | 6/1978 | Marron et al. | 96/125 |
| 4,134,743 | 1/1979 | Macriss et al. | 55/34 |
| 4,172,164 | 10/1979 | Meyer et al. | 428/72 |
| 4,259,092 | 3/1981 | Matsuo et al. | 55/78 |
| 4,289,513 | 9/1981 | Brownhill et al. | 96/135 |
| 4,324,564 | 4/1982 | Oliker | 55/20 |
| 4,341,539 | 7/1982 | Gidaspow et al. | 55/278 |
| 4,391,616 | 7/1983 | Imamura | 55/35 |
| 4,398,927 | 8/1983 | Asher et al. | 55/34 |
| 4,594,860 | 6/1986 | Coellner et al. | 62/271 |
| 4,595,403 | 6/1986 | Sago et al. | 55/389 |
| 4,701,189 | 10/1987 | Oliker | 55/34 |
| 4,701,431 | 10/1987 | Pine | 502/73 |
| 4,729,774 | 3/1988 | Cohen et al. | 55/181 |
| 4,769,053 | 9/1988 | Fischer, Jr. | 55/389 |
| 4,871,607 | 10/1989 | Kuma et al. | 428/186 |
| 4,875,520 | 10/1989 | Steele et al. | 165/10 |
| 4,886,769 | 12/1989 | Kuma et al. | 502/62 |
| 4,911,775 | 3/1990 | Kuma et al. | 156/208 |
| 5,017,268 | 5/1991 | Clitherow et al. | 162/181.6 X |
| 5,052,188 | 10/1991 | Komarneni et al. | 62/94 |
| 5,167,679 | 12/1992 | Maekawa et al. | 96/125 |
| 5,238,052 | 8/1993 | Chagnot | 96/125 X |
| 5,242,473 | 9/1993 | Ogasahara | 96/125 |
| 5,300,138 | 4/1994 | Fischer et al. | 96/125 |
| 5,308,703 | 5/1994 | Tsujimoto et al. | 96/154 X |
| 5,374,335 | 12/1994 | Lindgren et al. | 162/181.6 X |
| 5,401,706 | 3/1995 | Fischer | 96/125 X |

FOREIGN PATENT DOCUMENTS

| | | | |
|---|---|---|---|
| 3902977 | 8/1989 | Germany | 96/125 |
| 54-011890 | 1/1979 | Japan | 96/154 |
| 54-019548 | 2/1979 | Japan | 96/125 |
| 55-119418 | 9/1980 | Japan | 96/153 |
| 56-016096 | 2/1981 | Japan | 96/150 |
| 57-056019 | 4/1982 | Japan | 96/153 |
| 63-240921 | 10/1988 | Japan | 96/125 |
| 63-264125 | 11/1988 | Japan | 96/125 |
| 62-052037 | 2/1990 | Japan | 96/153 |

OTHER PUBLICATIONS

GRI Report—Development of Desiccant Materials for Cooling System Applications Phase 1, W. A. Belding et al., Oct. 1987–Nov. 1988, No. GRI–88/0343, Jan. 1989.
GRI Report—Advanced Desiccant Materials Assessment, R. K. Collier et al., Feb. 1985–May 1986, No. GRI–86/0181, Apr. 1986.

Primary Examiner—Robert Spitzer
Attorney, Agent, or Firm—Andrew Alexander

[57] ABSTRACT

An improved adsorbent composition for a natural gas-fired, adsorption cooling system that readily adsorbs moisture from ambient air, while being readily regenerated at high temperatures up to 200°–300° C. in order to provide an enhanced coefficient of performance to the system. Such an adsorbent composition may comprise an A-type zeolite, an X-type zeolite or a chemically modified Y-type zeolite either alone, in conjunction with each other or in conjunction with alumina and/or silica gel. A rotating adsorbent wheel may be fashioned from corrugated paper comprising the adsorbent composition and a slurry of synthetic, organic fibers which are preferably polyaramid fibers. The strength of the wheel may be enhanced by surface treating it with sols or salt solutions of alumina or silica, and a highly temperature-stable epoxy or phenolic resin.

33 Claims, 11 Drawing Sheets

ADSORPTION AIR CONDITIONING SYSTEM

BACKGROUND OF THE INVENTION

The present invention relates generally to air conditioning systems for regulating the temperature and humidity of ambient air, and more specifically to an efficient adsorbent composition and corrugated wheel medium for such a system.

Air conditioning systems include systems which regulate air temperature either by cooling or heating and regulate air humidity by humidifying or dehumidifying air. Conventional air conditioning systems typically use a heat-exchange medium like a refrigerant liquid which exits a compressor in a vapor phase at high temperature and pressure; passes through a heat exchanger, exiting in the liquid phase at moderate temperature and high pressure, and purging heat to the external environment; passes through a flow restriction, exiting as a mixed liquid and vapor at low temperature and pressure; enters a second heat exchanger to be gradually warmed by warm room air, cooling the room in the process; and finally returns to the compressor in the vapor phase at low temperature and pressure to start the process once again. However, the compressor is typically operated by electricity, which can be expensive, particularly in geographical areas characterized by severe climates or high costs for such service. Moreover, the use of conventional chlorofluorocarbons ("CFCs") like CFC-12 and hydrochlorofluorocarbons ("HCFCs") like HCFC-22 as refrigerant liquids has been shown to have adverse effects on the ozone layer, and is being gradually phased out.

In the past, alternative air conditioning systems have been developed to regulate the temperature and humidity of ambient air in an efficient manner without HCFCs or CFCs. Some systems even are powered by non-electric sources such as natural gas, which can be plentiful and inexpensive in some geographical areas.

An early system for drying air at ambient conditions was described in U.S. Pat. No. 2,926,502 issued to Munters. The Munters system utilized an adsorbent composition which dried the air by adsorbing the water out of the air. Such adsorbents which adsorb water are specifically referred to as desiccants.

In the Munters system, ambient air was passed through a rotating wheel made from corrugated paper formed from wool fibers or fibers of other highly hygroscopic materials to adsorb water moisture contained therein. A layer of silica gel could be added to the surface of the hygroscopic paper sheet to enhance the adsorption of water moisture from the ambient air. The process air exited the rotating wheel at a higher temperature due to the heat of adsorption, but was subsequently cooled by passing it through a heat exchanger countercurrent to a secondary air stream. Prior to entry into a room, the process air could be further cooled by adding moisture thereto, which also served to bring the humidity into the comfort zone. At the same time, the hotter secondary air stream was heated further by an electric heater, and used to regenerate the wheel by drawing off the moisture adsorbed therein. This open-cycle system which used one region of a rotating adsorbent wheel to adsorb moisture from ambient air, while using a secondary air stream to simultaneously remove moisture from another region of the wheel became known as the Munters Environmental Control ("MEC") System.

Many efforts have been made since the 1960's to improve the MEC system to meet general market needs, including the needs of the light commercial and residential sectors. One such improvement involved the substitution of a natural gas burner for Munter's electric heater. However, much of the development efforts have focused upon the search for an improved desiccant composition to provide enhanced adsorption/regeneration characteristics, to improve the thermal coefficient of performance ("COP") of the system, reducing operating costs, and to reduce the required equipment size through improved system cooling capacities, lowering the initial capital costs.

Hydrateable salt solutions like LiCl and LiBr have been applied to adsorbent wheels, as shown in U.S. Pat. No. 3,251,402 issued to Glav; U.S. Pat. No. 4,594,860 issued to Coellner et al.; and U.S. Pat. No. 4,729,774 issued to Cohen et al. However, these desiccant materials tend to deliquesce at high humidities and during periods of non-use, thereby causing the salts to "weep" from the wheel structure, and resulting in desiccant losses that greatly reduce system COP and in corrosion of the equipment. While the addition of a porous solid desiccant such as silica gel reduces this weeping phenomenon, it does not eliminate it.

Solid desiccants have also been used as the active component for adsorbent wheels. The COP and the cooling capacity of an adsorption system may be enhanced through improved adsorption performance, and higher than normal regeneration temperatures. Moreover, the total equilibrium capacity of the desiccant is important. While the rotational velocity of the adsorbent wheel can be increased to compensate for low adsorption capacity, if the wheel is turned too quickly and its heat capacity is too high, then excessive heat can be transferred to the adsorption side of the wheel, thereby reducing its COP.

An ideal desiccant for air conditioning applications is one for which, during the adsorption cycle, the moisture front will be sharp enough to be contained, and, during the regeneration cycle, will efficiently yield the adsorbed water without a breakthrough of the temperature front. Modeling of open-cycle adsorption systems (i.e., Collier et al. 1986) has indicated the need for a solid desiccant exhibiting a particular concave-down isotherm shape. The isotherm shape can be derived by the following formula:

$$\text{Water Loading} = \frac{RH}{[R + RH - R \cdot RH]}$$

where,

RH=relative humidity; and

R=separation factor.

The isotherm is derived by plotting normalized water loading (water loading divided by water loading at 60% RH) as a function of relative humidity.

As shown in FIG. 1, water adsorption Isotherm X with a separation factor R of 1.0 is linear in shape. Water adsorption isotherm Z with a separation factor R of 0.01 has a steep concaved-down shape similar to a Brunauer Type 1 isotherm as also shown in FIG. 1. Water adsorption Isotherm Y with a separation factor R of 0.1, falls between the linear and Type 1 isotherms, and is referred to more commonly as a Type 1M moderate isotherm. (Isotherm Y was derived, assuming a water loading of 25% at 60% RH.) An adsorbent wheel which exhibits Type 1M isothermal behavior would be desirable, but adsorbent wheels exhibiting such characteristics have not until now been possible.

Alumina has been used as a solid desiccant in systems disclosed by U.S. Pat. No. 4,398,927 issued to Asher et al., and U.S. Pat. No. 4,875,520 issued to Steele et al., while silica gel has been suggested by Steele, Cohen, Asher, Munters, U.S. Pat. No. 4,341,539 issued to Gidaspow et al., and U.S. Pat. No. 4,911,775 issued to Kuma et al. Asher and U.S. Pat. No. 4,871,607 issued to Kuma et al. have also suggested the combination of silica and alumina in an absorption system. However, it has been found that these particular materials have nearly linear water adsorption isotherms (i.e., R=1.0), which do not yield optimum adsorption performance in air conditioning systems, because the adsorption moisture fronts passing through the adsorbent wheel are too broad, and the early moisture breakthrough results in a low COP for the system.

Natural zeolites and synthetic molecular sieves also have been used as solid desiccant components. For example, U.S. Patent No. 4,886,769 issued to Kuma et al., and No. 4,769,053 issued to Fischer, Jr. have disclosed use of 4-A or 3-A zeolites, while U.S. Pat. No. 4,595,403 issued to Sago et al. and U.S. Pat. Nos. 3,844,737, 4,012,206, and 4,134,743 issued to Macriss et al., teach the use of a 13-X zeolite. However, such zeolites or molecular sieve compositions commonly exhibit isotherms having a separation factor that is too low. Isotherms with low separation factors indicate that the desiccant adsorbs water too strongly, thereby making it difficult to subsequently desorb the water during a regeneration cycle. This results in breakthrough of the thermal wave which reduces the COP for the system.

Support material for the desiccant composition in the wheel has been made from many different types of fibers using a conventional paper-making process. Munters teaches the use of wool fibers, while Glav discloses the use of cellulose fibers. Glav and Macriss teach the use of asbestos. The paper may be corrugated to form a fluted layer, which is then laminated to a flat layer to form channels through which the ambient air passes. It may then be spirally wrapped around a central hub to form the wheel.

The desiccant has generally been added to the surface of the previously formed paper (e.g., Glav, Coellner, Sago, Fischer, Kuma and Steele). However, such wheels have been limited in use by the temperature limitations of cellulosic fibers or environmental limitations of asbestos.

Temperature-resistant materials like glass or ceramic fibers have been used as supports for desiccants, as illustrated by Sago and Kuma. However, these materials must be formed into fluted structures before the desiccant is loaded into the structure, because loaded glass and ceramic fibers are vulnerable to brittle fracture during the corrugation process. Subsequent saturation of the corrugated glass fiber matrix with a desiccant slurry or solution results in relatively low total loadings of desiccant (<60%) even if multiple impregnations are used.

Other desiccant support materials that have been tried previously include metal strips (e.g., U.S. Pat. No. 4,172,164 issued to Meyer et al., and Fischer), and plastic matrices, such as nylon (e.g., Steele, Gidaspow, and Macriss). They have proved insufficient where high levels of moisture adsorption and desorption are required.

Since solid desiccants are most readily available in powdered or granular forms, it is necessary to bond the desiccant to or incorporate it into the wheel matrix. Since the physical integrity of the structure is a key concern for achieving extended wheel life, the materials must remain bonded to the structure after long-term operation of the wheel at higher-than-normal regeneration temperatures (e.g., up to 200° C.).

Although inactive components are used for the purpose of bonding, there are limits on the amount of these inactive components which may be used. Excessive use of organic components which can withstand regeneration temperatures can result in dilution of the adsorption system and blockage of the active desiccant pores, which results in reduced moisture adsorption of the wheel. Excessive amounts of inorganic binders can result in formation of brittle bonds that can be detrimental to wheel-forming operations.

SUMMARY OF THE INVENTION

It is an object of the present invention to provide an air conditioning adsorption system for regulating air temperature and/or humidity with improved efficiency.

Another object of the present invention is to provide an adsorbent composition which exhibits Type 1M isothermal behavior thereby readily adsorbing moisture from ambient air, while being readily regenerated for future adsorption cycles.

Another object of the present invention is to incorporate an adsorbent into a paper which sufficiently retains the adsorbent, so the paper has a large proportion of loading of adsorbent with respect to the weight of the paper.

A further object of the present invention is to corrugate the paper to provide channels through which air can flow.

Another object of the present invention is to provide a rotating adsorbent wheel made of the corrugated paper for such an adsorption system.

Yet another object of the present invention is to provide an adsorbent wheel that is stable during thermal cycling and degrades minimally at regeneration temperatures of up to 200°–300° C. for extended cycles of adsorption and desorption.

Still another object of the present invention is to provide such a system with a high conditioning capacity in a compact size.

Yet another object of the present invention is to provide such a system which runs on an economical fuel like natural gas.

Other objects of the invention, in addition to those set forth above, will become apparent to those skilled in the art from the following disclosure.

Briefly, the invention is an improved air conditioning system which utilizes a wheel comprising an adsorbent paper composition that both readily adsorbs moisture from ambient air and readily desorbs moisture at high temperatures of up to 200°–300° C. in order to enable the system to operate with an enhanced coefficient of performance. The adsorbent composition comprises an A-type zeolite, an X-type zeolite or a chemically modified Y-type zeolite either by itself, in conjunction with each other or in conjunction with alumina and/or silica gel. A rotating adsorbent wheel is fashioned from corrugated paper comprising the adsorbent composition and a slurry of organic fibers, although fibers from the polyaramid family are preferred. The strength of the wheel may be enhanced by surface treating it with sols or salt solutions of alumina or silica and/or a highly temperature-stable epoxy or phenolic resin.

DETAILED DESCRIPTION OF THE PREFERRED EMBODIMENT

Figure 1:
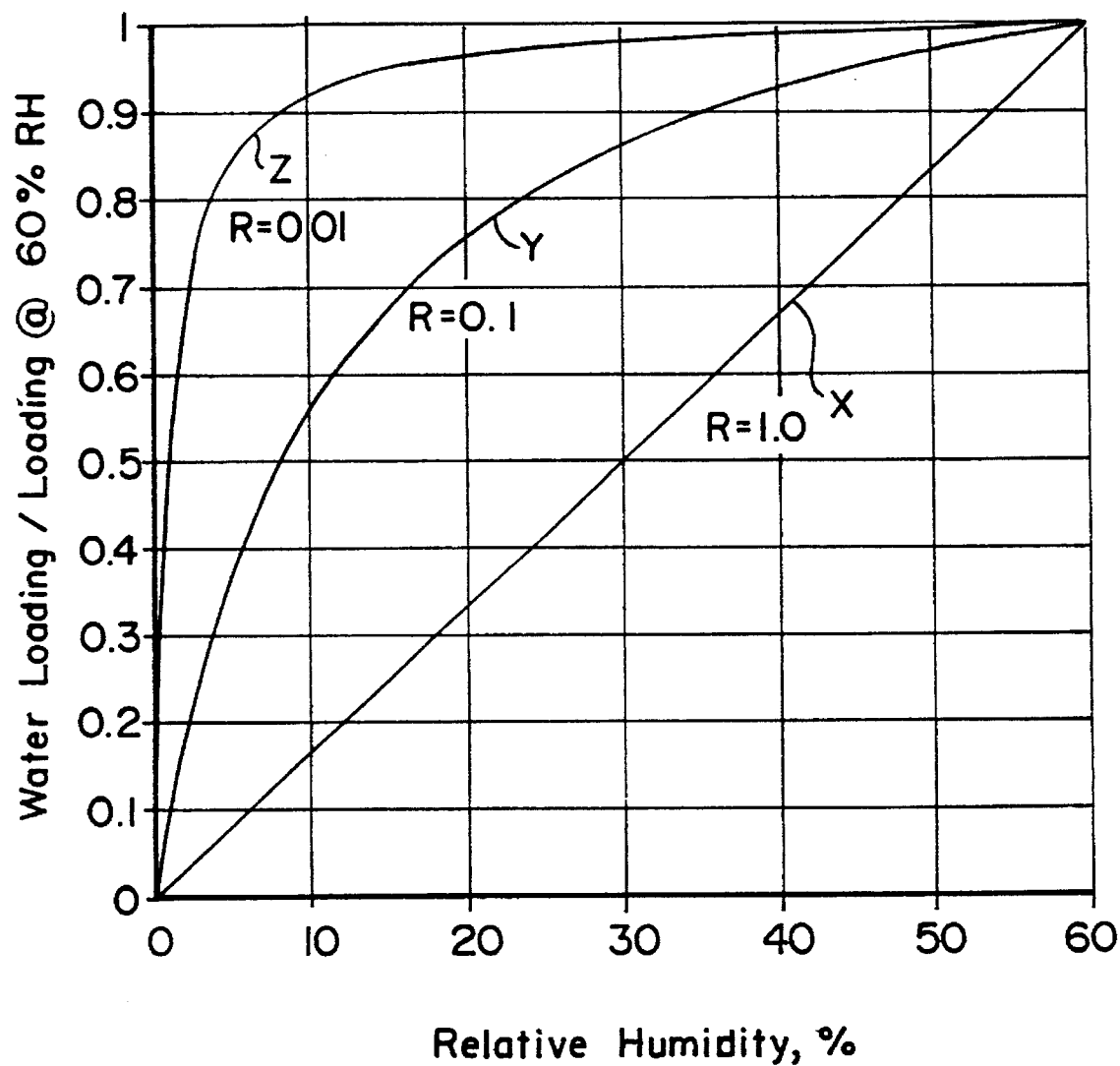
FIG. 1 is a graph comparing water adsorption isotherms X, Y and Z, all with different separation factors.
Figure 2:
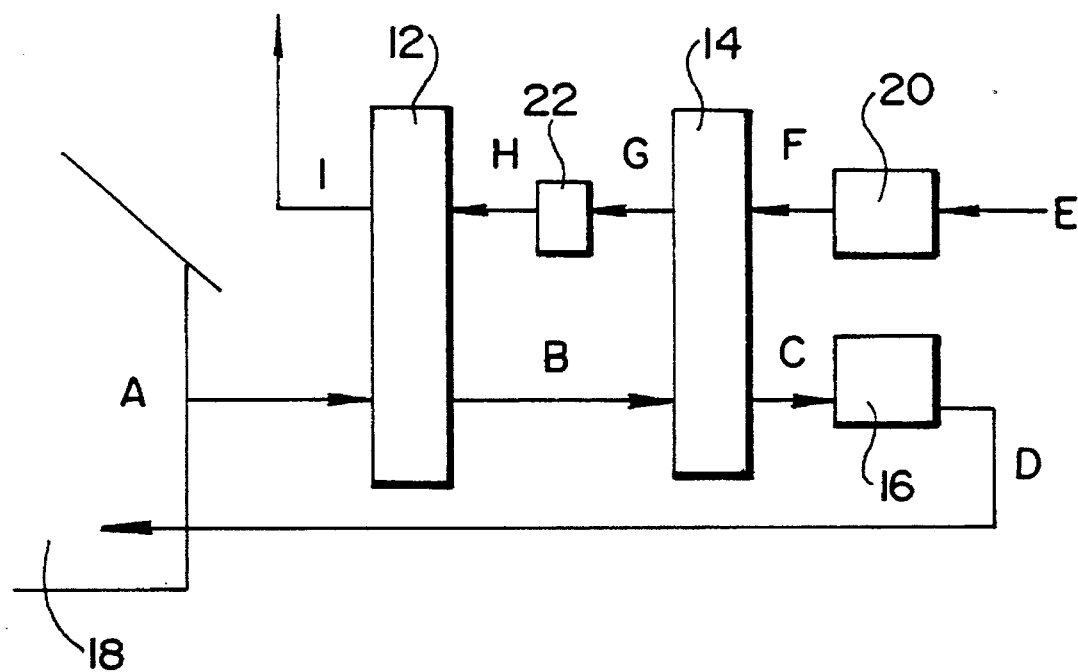
FIG. 2 is a schematic representation of a preferred embodiment of an open-cycle adsorption air conditioning system of the present invention running in the recirculation mode.
Figure 3:
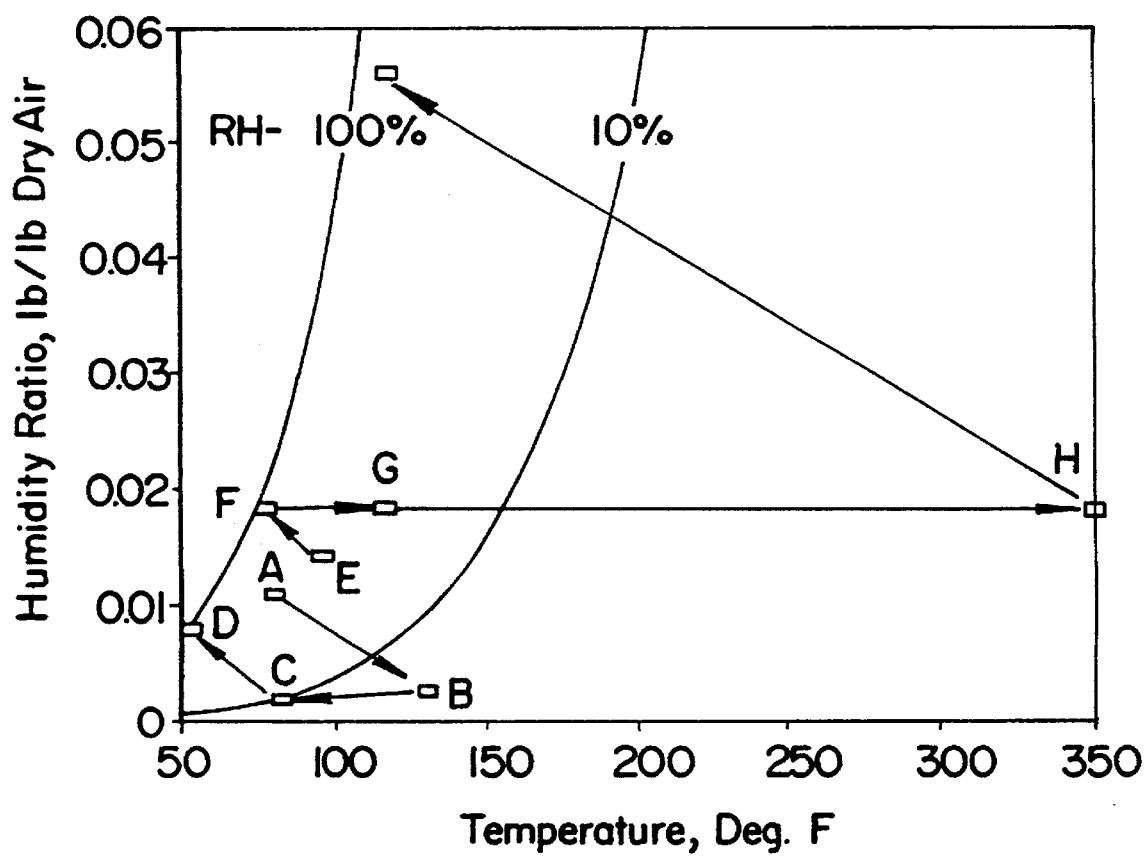
FIG. 3 is a psychrometric representation of the system of the present invention shown in FIG. 2.

The present invention contemplates air conditioning systems for regulating the temperature and/or humidity of air. Although the air conditioning system of the present invention may take the form of many embodiments, the preferred embodiment of the present invention is illustrated generally in schematic form in FIG. 2 and in psychrometric form in FIG. 3, showing operation of the system in a recirculation mode. Air from the building 18 at A is adiabatically dehumidified by an adsorbent wheel 12. The resulting hot, dry air at B is cooled by a sensible heat exchange wheel 14 to create dry, cool air at C. This air is then adiabatically humidified by an evaporative cooler 16 to produce cold, nearly saturated air D that reenters a building 18. At the same time, however, outside air E is adiabatically humidified by an evaporative cooler 20 to produce cooler, more humid air F, which is then passed through the sensible heat exchange wheel 14, recouping as much of the sensible heat yielded thereto by process air B, as possible. The enthalpy of air G is then increased by a thermal energy input like a natural gas burner 22. The still hotter air H is then passed through the adsorbent wheel 12 to desorb water moisture, thereby regenerating it. Finally, the warm, humid air I exiting the adsorbent wheel 12 is exhausted to the atmosphere.

This continuous recirculation operational mode may likewise be run on a ventilation basis (not shown). By separating the process and regeneration air streams in the adsorption cooling system, the cooling/dehumidifying, and heating/humidifying functions, respectively, may be performed simultaneously as the adsorbent wheel and the heat exchanger wheel counter rotate with respect to each other.

The present invention is specifically directed toward the adsorbent wheel 12. The adsorption wheel of the present invention comprises a desiccant composition with a separation factor R in a range which will provide an efficient COP for the system incorporated into a paper support which adequately retains the desiccant composition while minimally interfering with the performance of the desiccant composition.

Figure 4:
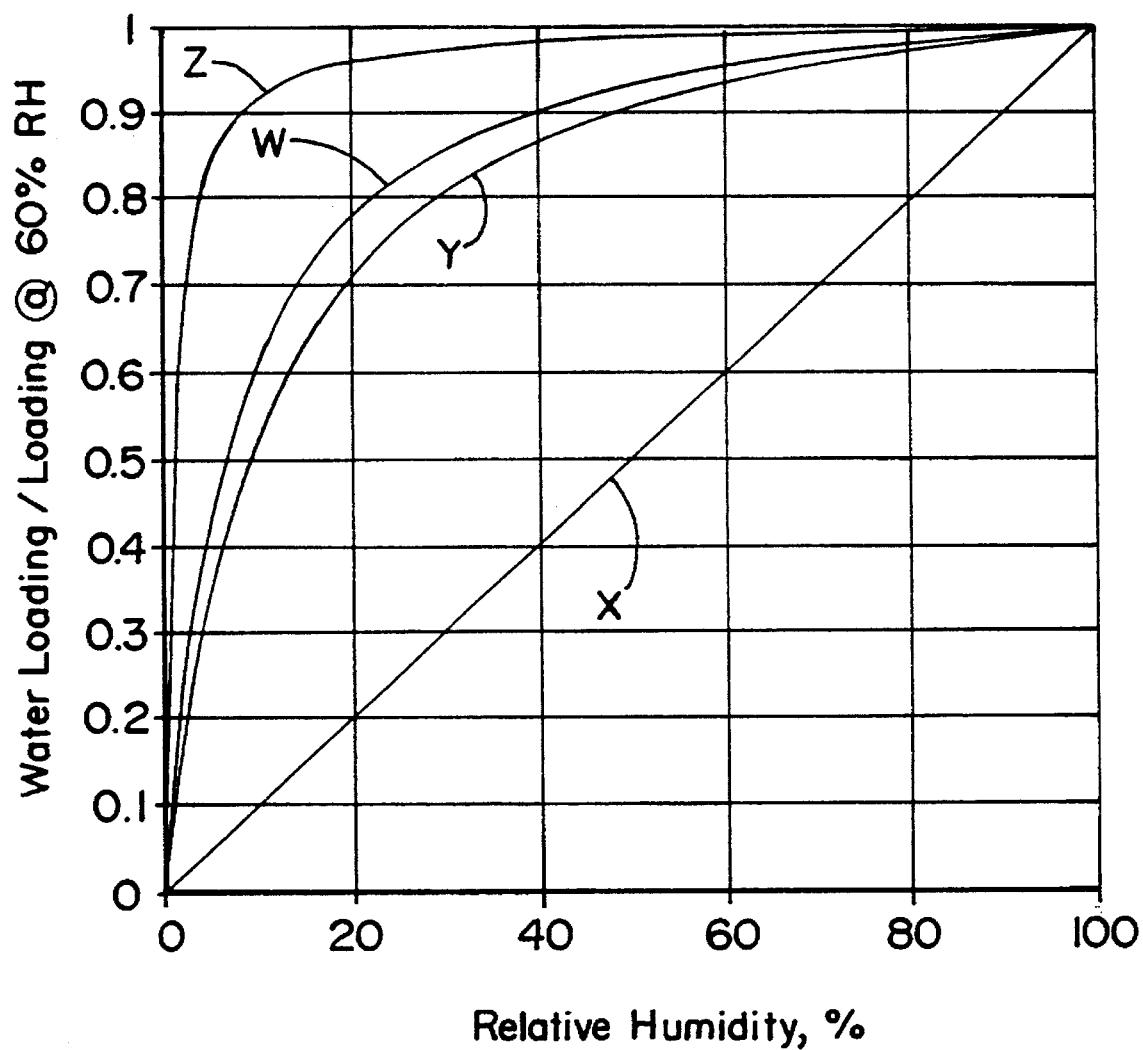
FIG. 4 is a graph comparing water adsorption isotherms W, X, Y and Z.

Although the optimum shape of the system isotherm will vary somewhat depending upon the inlet and regeneration conditions, optimal system performance results from desiccant compositions, having separation factors in the 0.03 to 0.2 range. Preferred system performance results from desiccant compositions, having separation factors in the 0.07 to 0.1 range as illustrated by the region between Isotherms W and Y in FIG. 4.

In accordance with the present invention, there is provided a highly adsorbent wheel formed from an adsorbent paper comprising: (1) desiccant material containing either an A-type zeolite, an X-type zeolite, or a chemically modified Y-type zeolite by itself, in conjunction with each other, or in conjunction with silica gel and/or alumina; and (2) temperature-resistant, fibrillated fibers of synthetic, organic composition.

A number of different blends of the zeolite-alumina-silica gel constituents may be used to accomplish the goals of the present invention. A blend comprising 20–80 wt % 13-X zeolite, 20–70 wt % alumina, 0–40 wt % silica gel is a suitable desiccant composition. Preferably, 13-X zeolite:alumina:silica gel ratios of 20:45:35 or 50:50:0 wt % may be used. Even more preferably, a 34:33:33 blend should be used. A chemically modified Y-type zeolite either alone or in conjunction with an X-type zeolite, alumina and/or silica makes a preferable desiccant composition for the present invention. It is more preferable to use the chemically modified Y-type zeolite alone as a desiccant composition.

We determined desiccant isothermal behavior using a series of chambers in which relative humidities were controlled using aqueous solutions of sulfuric acid having varying concentrations. The chambers were separated with perforated porcelain plates, which allowed circulation of the air with the help of fans mounted at the top of the chambers. The acid solutions in the bottom of the chambers were continuously stirred with magnetic stirrers.

Specimens were first pretreated in a forced draft oven at 400° C. for one hour. To simulate one adsorption half-cycle, the samples were removed and allowed to reach equilibrium with laboratory air (approximately 23° C., 50% RH) for one hour. The specimens were once again transferred to a forced draft oven, and held at 200° C. for one hour simulating one regeneration half-cycle.

The specimens were transferred hot to previously tared, glass vessels which were sealed and cooled in a desiccator before weighing. After weighing, samples were placed in respective humidity controlled chambers and allowed to equilibrate for 24 hours, or a longer period if the weight was not yet stable. Equilibrium desiccant water loading, L, was calculated for each relative humidity, RH, from the final and initial specimen weights, as follows:

$$L = \text{(Final Weight} - \text{Initial Weight)/Initial Weight}$$

Figure 5:
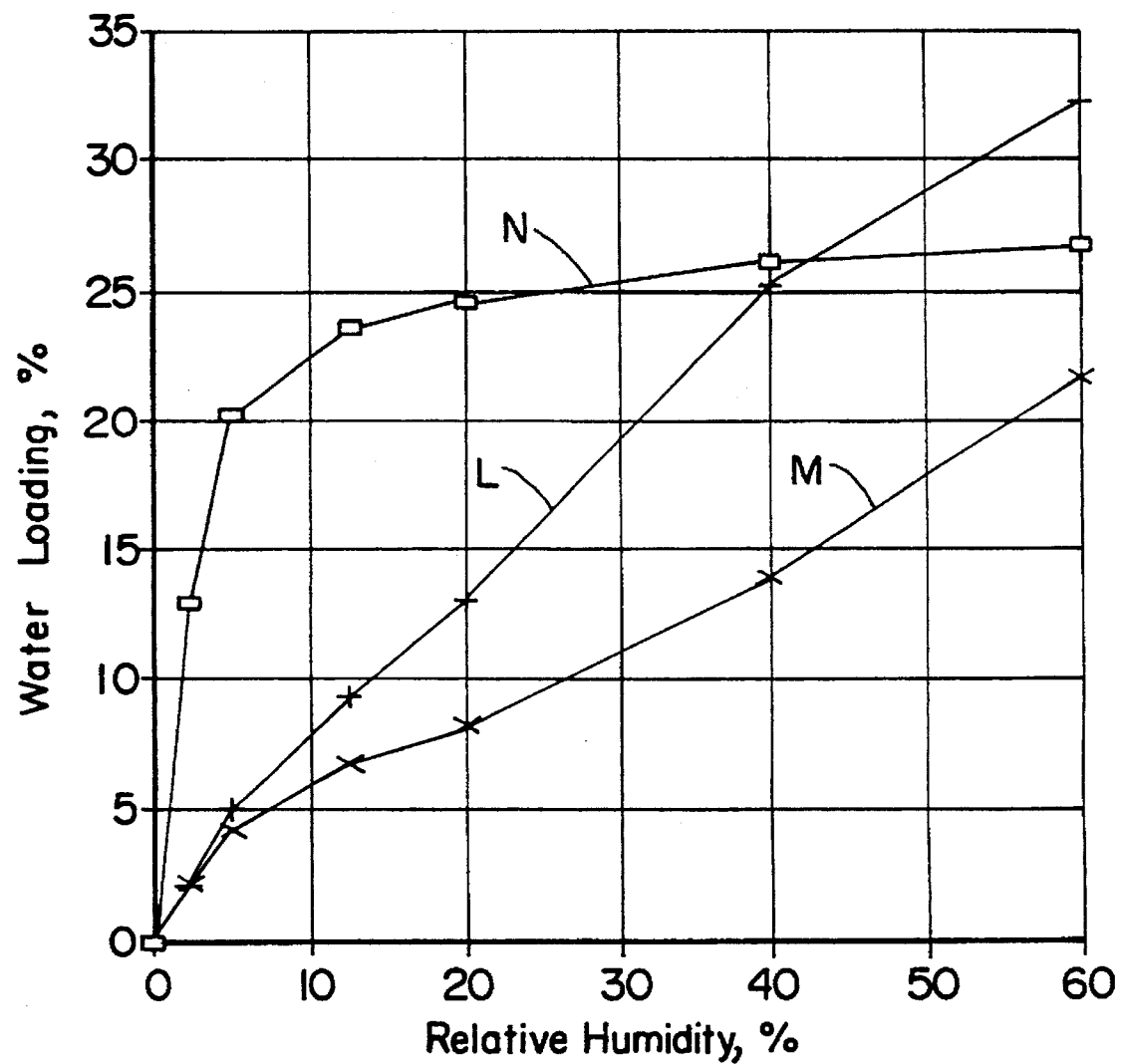
FIG. 5 is a graph comparing water adsorption isotherm L for silica gel, adsorption isotherm M for pseudoboehmite alumina, and adsorption isotherm N for a 13-X molecular sieve, all components of a preferred embodiment of the present invention.

A moisture loading Isotherm L for the preferred silica gel sold by the Davison Division of W.R. Grace. as SYLOID® 63 is shown in FIG. 5. As illustrated by Isotherm L, silica gels exhibit nearly linear isotherms, because they are unable to completely contain moisture wave fronts during adsorption. Therefore, an adsorbent wheel containing only silica gel as a desiccant component is unacceptable for use in a high-efficiency air conditioning system. However, because silica gel is good for imparting moisture uptake in the 30–50% RH range, it can be advantageously blended with a desiccant having enhanced moisture uptake in the low humidity range, such as 13-X zeolites.

The alumina component of the preferred desiccant composition is characterized by an active high surface area phase which can include pseudoboehmite, chi, rho, eta, gamma or a combination of these phases. Pseudoboehmite aluminas are preferred because of their narrow distribution of internal small pores. Excessive macroporosity is undesirable, because it only contributes to water adsorption capacity at a high relative humidity (i.e., >60% RH), which is atypical of indoor environments. An Isotherm M for a pseudoboehmite alumina sold by LaRoche Industries Inc. as VERSAL® 900 is illustrated in FIG. 5. Other available, suitable aluminas include VERSAL® 850 sold by LaRoche Industries Inc., and CATAPAL D sold by Vista Chemicals.

As seen from Isotherm M in FIG. 5, the total equilibrium capacities of aluminas are too low (14–16%) at 40% RH, and the shape of their isotherms in the 40–60% RH range even becomes concave-up, which contributes to spreading of their dynamic wave fronts in the end application, thereby making them unacceptable as a desiccant by themselves in high-efficiency air conditioning systems, although they may be advantageously combined with 13-X zeolite in the present invention.

As illustrated by Isotherm N in FIG. 5, the X-type zeolites exhibit predominantly Type 1 isothermal behavior. While A-type zeolites are suitable for use in the present invention, A-type zeolites have small channel sizes (e.g., 3–5Å), have low silica-to-alumina ratios (e.g., 2:1), and exhibit extreme Type 1 isothermal behavior. X-type zeolites have been found to provide improved performance compared with A-type zeolites, likely due to their larger channel openings (about 9Å), and slightly higher silica-to-alumina ratios (e.g., 2–3:1).

X-type zeolites, such as the commercially available 13-X molecular sieve sold by the Molsiv Adsorbents Division of UOP, Inc., have been found to provide performance suitable for the present invention. This 13-X molecular sieve has channel openings of about 9Å and a silica-to-alumina ratio of about 2–3:1.

In order to determine the adsorption isotherms of two different desiccant blends, aliquots of 13-X molecular sieve sold by the Molsiv Adsorbents Division of UOP, VERSAL® 900 pseudoboehmite alumina, and SYLOID® 63 silica gel were heated at 200° C. for 1 hour to determine their respective weight losses, so that the desiccant components could be proportioned on a dry weight basis. Losses were 10.4%, 10.7% and 2.0%, respectively, for the components. Physical blends denominated composites A and B were prepared with compositions shown in Table I.

TABLE I

| | Compositions of Composites | | | | | |
|---|---|---|---|---|---|---|
| | 13-X Zeolite | | Alumina | | Silica Gel | |
| Composite | wt. (g) | wt % | wt. (g) | wt % | wt. (g) | wt % |
| A | 22.3 | 20 | 50.4 | 45 | 35.7 | 35 |
| B | 37.9 | 34 | 36.9 | 33 | 35.7 | 33 |

Composites A and B were individually mixed with an amount of water in excess of that required to fill all the pores of the desiccant. The aqueous mixtures were then dried at 105° C. for 16 hours. The resulting hard-packed composites were then crushed to approximately ⅛-inch granules, and thermally activated in air at 200° C. for 1 hour.

Figure 6:
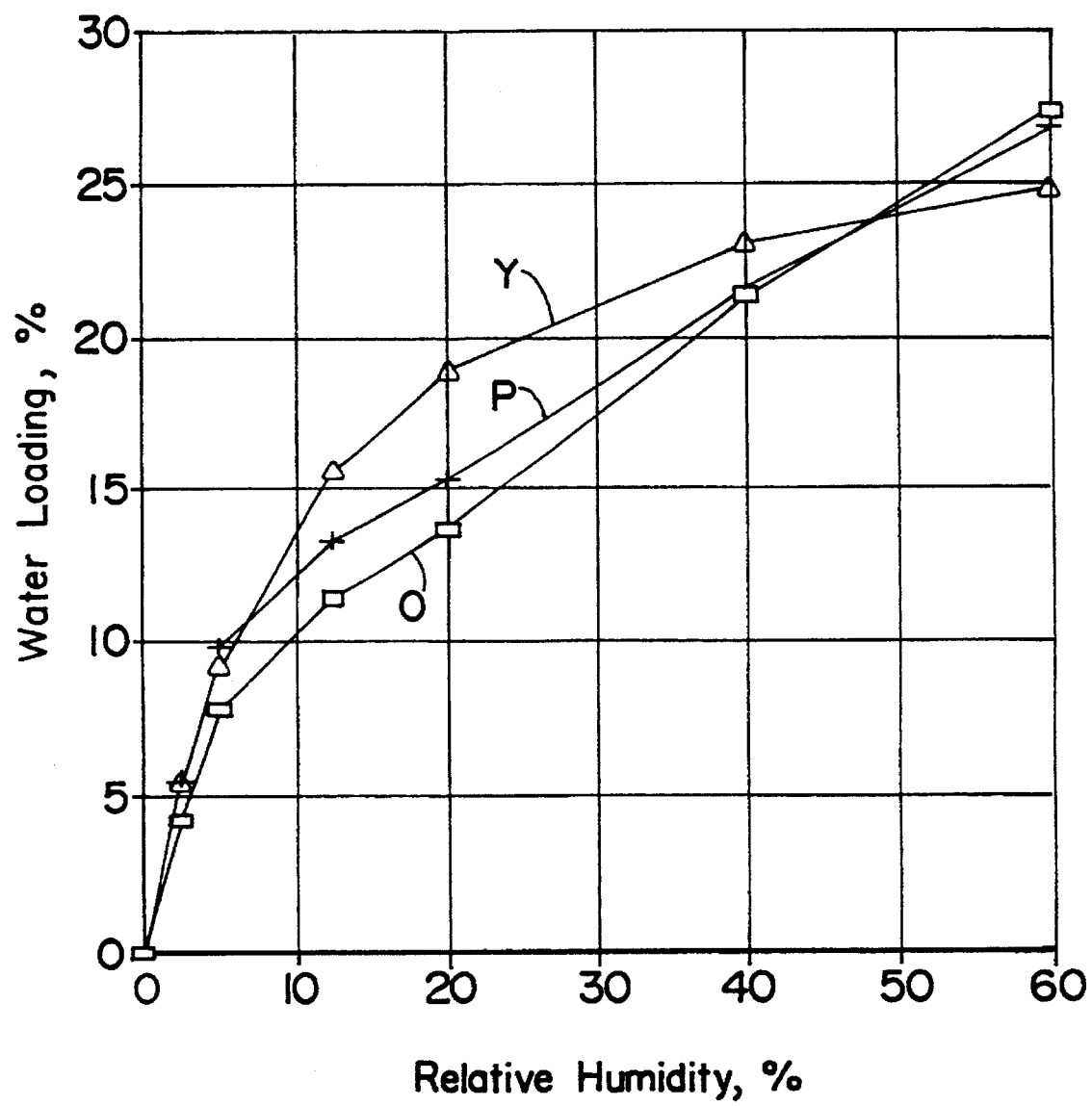
FIG. 6 compares water adsorption isotherms O and P of two adsorbents made in accordance with the present invention to adsorption isotherm Y from FIG. 4.

Adsorption isotherms were determined for composites A and B as previously described, and the results are shown in FIG. 6 in which isotherm O represents the performance of composite A, and isotherm P represents the performance of composite B. As can be readily seen, the alumina and silica gel constituents modified the normal Type 1 behavior of the 13-X zeolite component illustrated as Isotherm N in FIG. 5. Isotherms O and P for the A and B composites, respectively, more closely approach the desirable Type 1M behavior of Isotherm Y with a separation factor of 0.1.

Isotherm P for the Composite B containing equivalent parts of 13-X zeolite, alumina, and silica gel closely approaches the Type 1M Isotherm Y over the entire range of 0–60% RH, particularly when compared with Isotherm N for the individual 13-X zeolite component, Isotherm M for the individual alumina component, and Isotherm L for the individual silica component.

A preferred alternative to a composite-based desiccant blend, as mentioned, is the use of a Y-type zeolite, since its structure is stable over a silica-to-alumina mole ratio range of 3:1 to 6:1. Techniques have been developed in the art for chemically modifying the silica-to-alumina ratio of Y-type zeolites by either varying the silica content of the initial solution batch, or by de-aluminating the zeolite subsequent to the crystallization step by acid leaching (see, e.g., U.S. Pat. Nos. 3,293,192 and 3,402,996 issued to Maher et al.; U.S. Pat. No. 4,701,431 issued to Pine; and U.S. Pat. No. 5,052,188 issued to Komarneni et al.).

Figure 7:
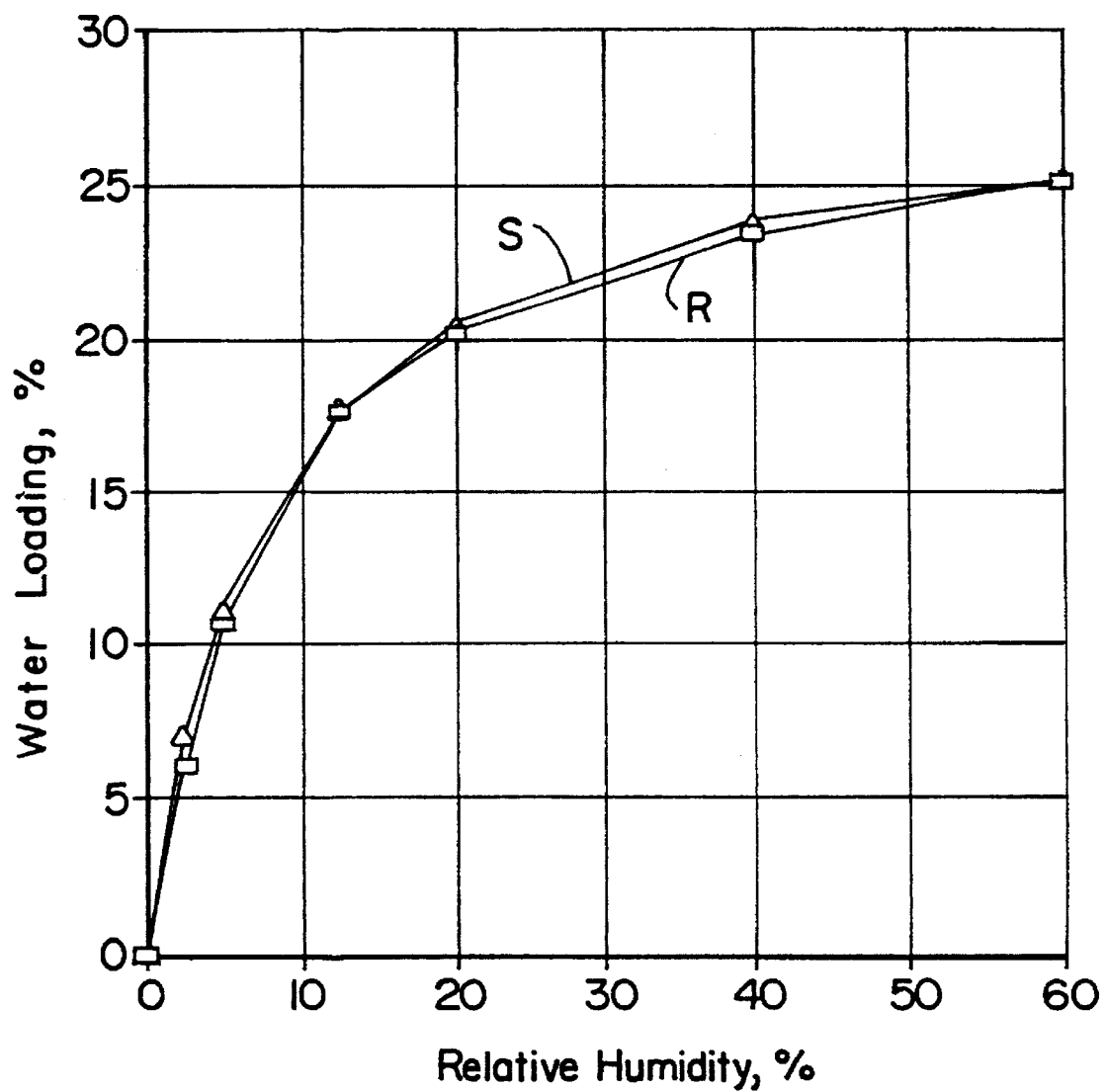
FIG. 7 is a graph comparing the water adsorption Isotherm R for a chemically modified, Y-type zeolite, an alternative preferred embodiment of the present invention, to water adsorption Isotherm S with a separation factor of 0.07.
Figure 8:
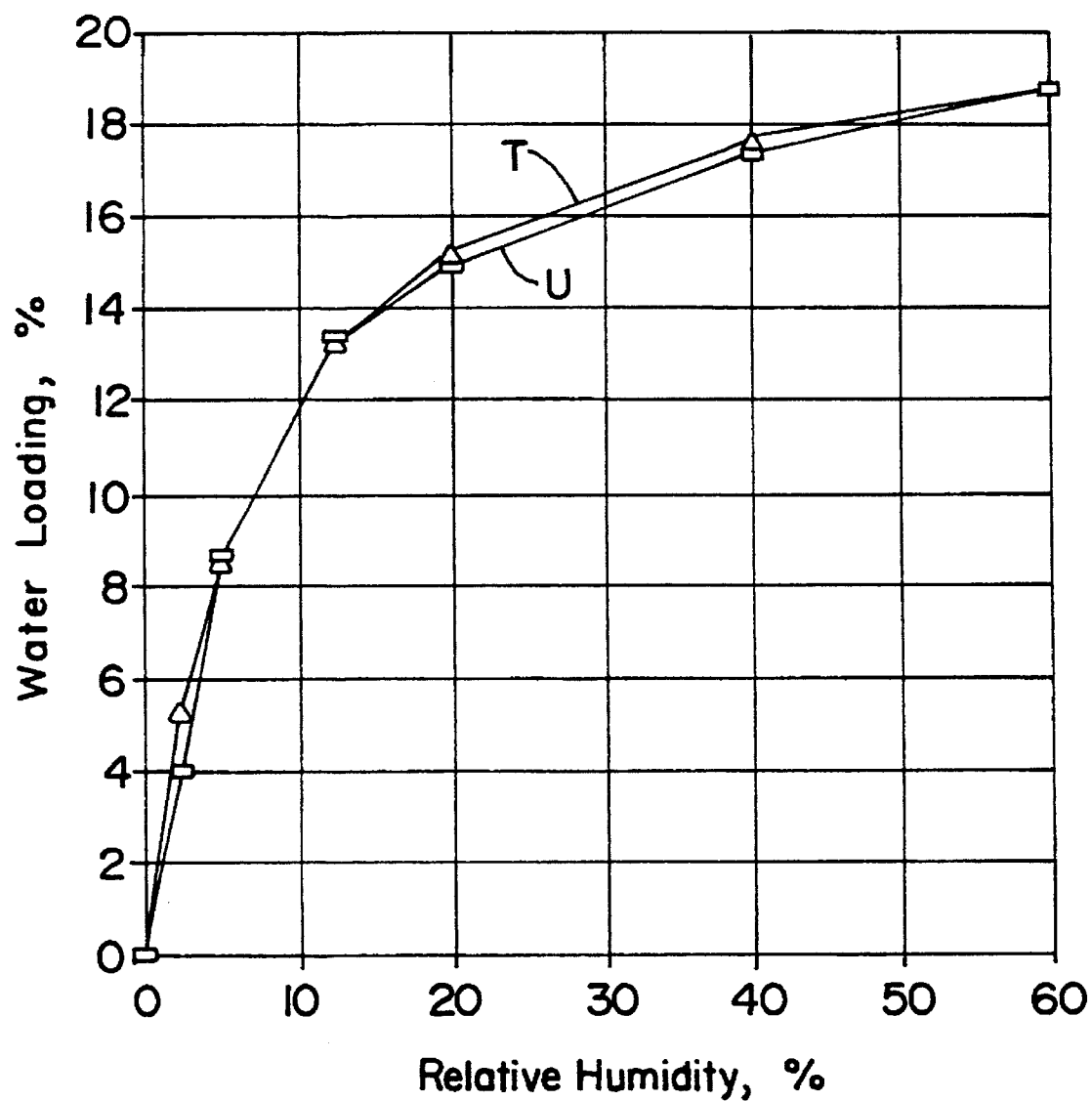
FIG. 8 is a graph comparing water adsorption Isotherm U for paper made in accordance with the present invention incorporating a chemically modified, Y-type zeolite to a normalized water adsorption Isotherm T with the separation factor of 0.07.

Y-type zeolites provide water adsorption isothermal behavior which is desirable for the present invention. FIG. 7 compares Isotherm R, the water adsorption isotherm for US-Y Valfor CBV-500 sold by P.Q. Corporation having a silica-to-alumina ratio of 5.2:1, to Isotherm S, an isotherm with a separation factor of R=0.07. As shown in FIG. 8 a paper hand sheet made using the modified Y-type zeolite desiccant provides an Isotherm U that almost precisely matches a normalized Isotherm T with the same separation factor of R=0.07, thereby easily falling within the preferred R=0.07–0.10 range. Therefore, it is clear that this material alone meets the desired isothermal standard with high moisture uptake (i.e., 25%) at 60% RH. This material could be used as a single desiccant component or blended with other desiccants to provide high-efficiency desiccants for wheel manufacture.

Figure 9:
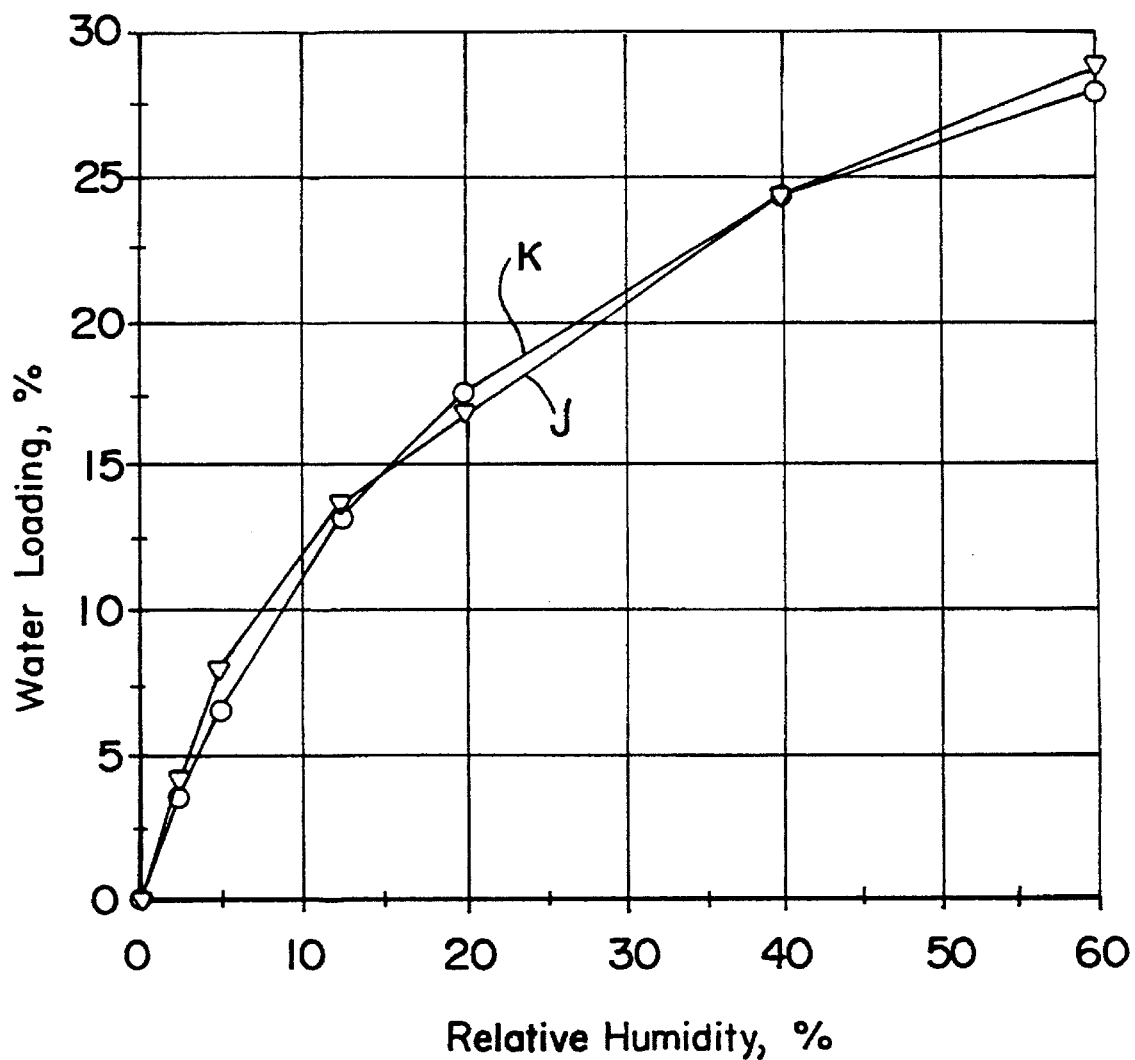
FIG. 9 is a graph comparing water adsorption Isotherm J of an adsorbent composition containing a blend of equal parts of a chemically modified, Y-type zeolite and silica gel to water adsorption Isotherm K having a separation factor of 0.2.

The Y-type zeolite can be blended with silica gel to modify the separation factor of the desiccant composition. Valfor CBV-500 Y-type zeolite was blended with SYLOID® 63 silica gel in a 1:1 weight ratio to produce a desiccant composition. Examination of the isothermal behavior of the desiccant composition yielded water adsorption Isotherm J shown in FIG. 9. Isotherm J fits very closely with Isotherm K which is a Type 1M water adsorption isotherm with a separation factor of 0.2, also shown in FIG. 9.

Figure 10:
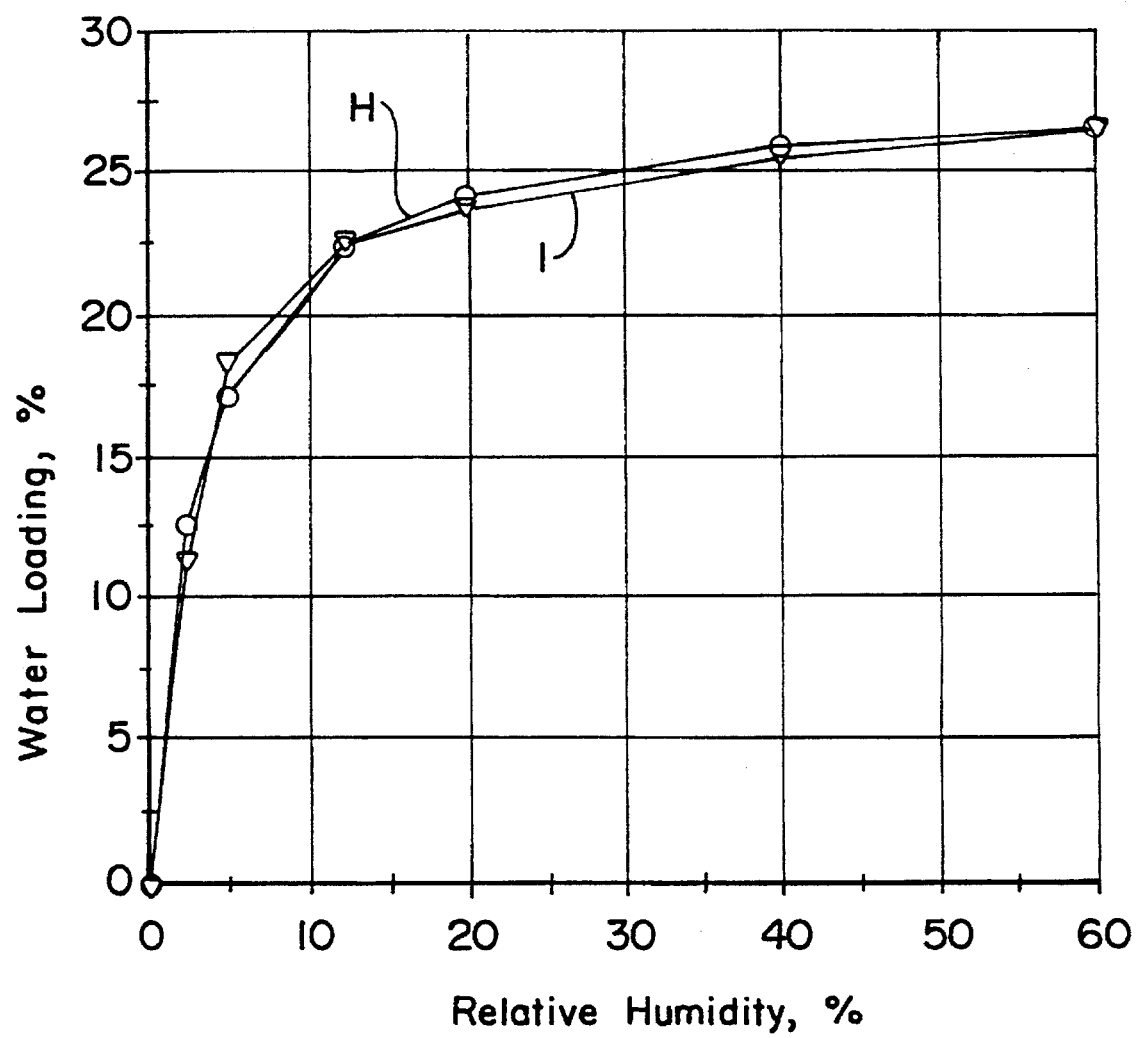
FIG. 10 is a graph comparing water adsorption Isotherm H of an adsorbent composition containing a blend of four parts of a 13-X zeolite and one part of a chemically modified, Y-type zeolite to water adsorption Isotherm I having a separation factor of 0.03.

Modification of isothermal behavior is also achieved by blending a Y-type zeolite with an X-type zeolite. Four parts by weight of 13-X zeolite were blended with one part by weight of CBV-500 Y-type zeolite and tested. The resulting Isotherm H of the blend is compared to Isotherm I having a separation factor of 0.03 in FIG. 10. As shown, Isotherm H very closely fits Isotherm I.

As demonstrated, these desiccant components can be blended in varying proportions to obtain a desiccant composition having a desired isothermal behavior as defined by the separation factor. The isothermal behavior desired will depend on the conditions under which the adsorption system will operate and also the level of output demanded from the system.

Accordingly, the present invention provides a highly adsorptive adsorbent wheel formed from an adsorbent paper comprising a desiccant material containing either an A-type zeolite, an X-type zeolite, or a chemically modified Y-type zeolite by itself, in conjunction with each other, or in conjunction with silica gel and/or alumina. We now turn to describe the paper support for retaining the desiccant on the wheel.

A number of different organic and inorganic fiber materials have been used to make the adsorbent paper for the adsorption wheel with limited success. For example, inorganic fibers like fine-diameter fiberglass, mineral wool, or other ceramic materials have high temperature stability, but they suffer from cracking during the paper corrugation stage. Natural organic fibers like cotton or wood are available, but they subject the system to regeneration temperature limitations. Natural inorganic fibers like asbestos are not desirable because they are subject to health, environmental and safety limitations.

The desired fiber materials for the present invention are synthetic, organic fibers like those falling in the families comprising high-density polyethylenes, high-density polypropylenes, aromatic polyamides (i.e., aramids), polystyrenes, aliphatic polyamides, polyvinyl chlorides, polyesters, nylons, rayons (e.g., cellulose acetate), acrylics (e.g., CFF® fibrillated fibers sold by American Cyanamid), acrylonitrile homopolymers, copolymers with halogenated monomers, styrene copolymers, and mixtures of polymers (e.g., polypropylene with low-density polyethylene, and high-density polyethylene with polystyrene). Synthetic, organic fibers can be in staple form (chopped yarns), fabricated form (staple that has been refined) or extruded/precipitated form (i.e., polymer dissolved in a solvent precipitated by a nonsolvent or other forming technique).

The preferred fiber for the adsorbent wheel of the present invention is an aramid. The preferred fiber is a long-chain synthetic aromatic polyamide having at least 85% of the amide (—CO—NH—) linkages directly attached to the two aromatic rings. The preferred fiber is known particularly as KEVLAR®, manufactured by E.I. du Pont de Nemours & Co. ("DuPont"). KEVLAR® is commercially available as a refined pulp designed for paper forming, such as KEVLAR® 303 pulp. During refining, high shear is applied to the KEVLAR® fiber shafts which split at their ends into fibrils to create a tree-like structure. In the final paper product, these fibrils interlock to enhance the paper strength. Additional refining of the prerefined commercial KEVLAR® fibers may be necessary to further enhance the paper strength. KEVLAR® is stable in oxidizing atmospheres up to 450° C. Other high-temperature aramids such as NOMEX® manufactured by DuPont, TWARON® manufactured by AKZO Fibers Inc., and TEIJINCONEX and TECHNORA manufactured by Teijin Ltd. Japan are also suitable materials.

The paper of the present invention is prepared by wet-laying the desiccant and fibers into a continuous sheet or a hand sheet. The paper is then formed into a single-faced corrugated laminate, which is spirally wrapped to make the adsorbent wheel. The fibrillated organic fibers provide suitable reinforcement at levels as low as 15% by weight of the total paper structure due to their strength and ability to interlock. Although some paper of suitable strength was made with only 10% by weight fibers, such paper was too thick for ideal usage.

The following parameters for the paper making process are provided. The paper can be formed into a hand sheet or into a continuous sheet. Paper hand sheets were made using a paper hand sheet mold apparatus, comprising an open-top vessel divided into top and bottom sections by a wire mesh screen. The lower section was sealed by a flush valve which extended into a standpipe, and filled with water to about ¼ to ¾ of the top section.

A desiccant slurry was prepared with 12.64 grams of Composite B from Table I (200° C. basis) in 650 milliliters of water in order to yield 80% by weight desiccant (200° C. basis) in the final paper. It is advantageous to add sufficient desiccant to provide at least 60% and as high as 80% desiccant in proportion to the total weight of the paper. The preferred proportion of desiccant to paper is 75%. The volume of water is not critical but, should be sufficiently large to achieve a low viscosity and be sufficiently small to avoid excessive drain times, which slows the paper production rate. The desiccant slurry and 3.16 g of KEVLAR® 303 refined pulp were dispersed in a blender to simulate a pulper or a beater and then added to the top section of a 12 inch square hand sheet mold apparatus device.

Figure 11:
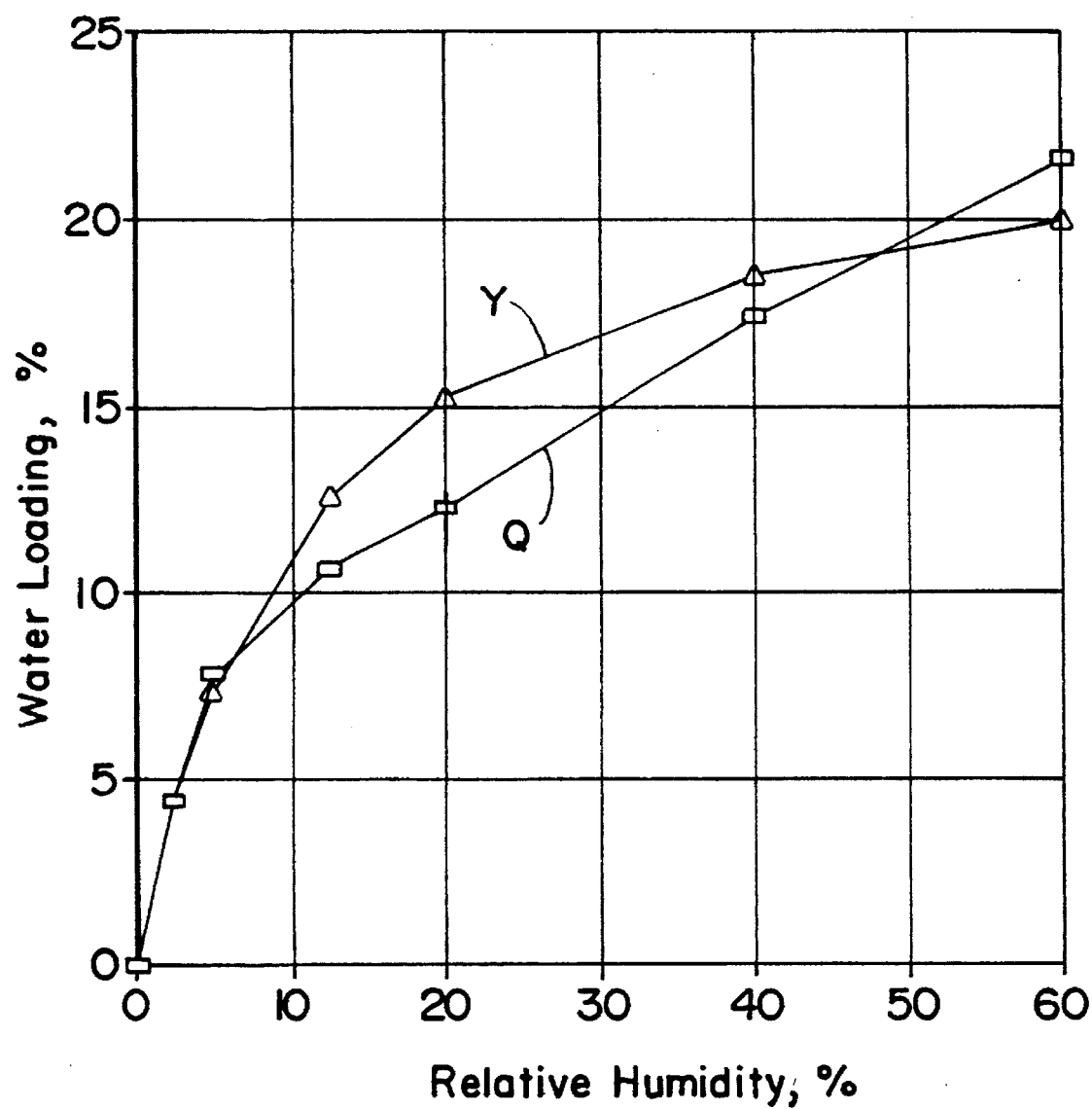
FIG. 11 is a graph comparing the water adsorption Isotherm Q of a paper hand sheet made with an adsorbent composition of approximately equal parts of alumina, X-type zeolite and silica gel to water adsorption Isotherm Y from FIG. 4.

The mixture was stirred until visible flocs formed, the flush valve opened, and the slurry water drained through the forming section. After the resulting paper hand sheet was peeled from the screen, it was placed on a photographic print drier at 200° C. for 10 minutes to dry. An adsorption Isotherm Q was determined for the paper made with Composite B, and is compared to Type 1M Isotherm Y in FIG. 11.

To prepare a slurry for continuous paper production, the KEVLAR® 303 pulp (having fiber shafts approximately 12 μm in diameter and up to 4 mm in length) was first dispersed in an aqueous slurry within a make-up tank. This fiber slurry was then fed to a disc or other high-shear refiner which further split the fibrillated fiber shafts into additional fibrils. This refining step yielded KEVLAR® 303 fiber shafts ranging from 1 mm to 4 mm in length with fibrils extending therefrom as small as 1 μm to 3 μm in diameter. The resulting pulp slurry was then transferred to the head box of the paper machine.

Additives (e.g., retention aids) and binders known in the art of specialty paper making were added together or sequentially to the desiccant slurry to improve the retention of the desiccant components within the fiber matrix, and to improve paper strength. Such additives include starch, polyvinyl alcohols (PVA), acrylics, microcrystalline cellulose (e.g., carboxymethyl cellulose) and colloidal silica. The organic additives are added in an amount of about 5% by weight of fiber plus desiccant on a 200° C. basis. Colloidal silica is added in an amount of about 15% by weight on the same basis. These additives may be added to the makeup tank with the refined fiber and/or added to the head box.

Continuous paper sheets were made with a Fourdrinier paper machine. The desiccant slurry and the fiber slurries previously described are typically added continuously to the head box of the paper machine and mixed under low shear. A flocculent is continuously added to the head box, and sufficient retention time is provided for the desiccant fiber suspension to form visible flocs which should be considerably larger in diameter than the initial desiccant components. Retention aids and binders such as starch and silica are also added continuously to the flocculated slurry.

The flocculated slurry typically overflows the head box and onto the forming section which can consist of a continuous fine mesh screen belt known in the industry as a "wire". The top surface of the wire moves horizontally away from the head box to provide a continuous paper making process. Water is pulled through the wire by a vacuum provided by a series of vacuum boxes. As the water passes through the forming section, the fibers and desiccant are left on the wire, thereby forming a wet paper. As the speed of the wire is variable, it can be controlled to provide different paper basis weights, and allow for different drainage rates. The flow of slurry to the head box is also typically controlled in conjunction with the wire speed adjustments. High belt rates are desirable for economical production and also to produce a thin paper (i.e., <0.013 inches thick after calendaring).

Once the paper leaves the forming section, it passes onto a wet press section, and then onto a series of steam-heated drying rolls. The dry paper may optionally be passed through a stack of calendaring rolls, which reduce the paper thickness, and provide a smoother surface finish. Drying can also be conducted on cans with a through dryer, a tunnel dryer or other suitable device.

The hand sheets and continuous sheets of adsorbent paper made with Composite B were tested for tensile strength and compared. The sheets were cut into five strips, measuring 1 inch wide by 5 inches long. They were then dried in a forced draft oven for 1 hour at 200° C. Upon clamping the ends of each strip in the jaws of a Chatilion tensile strength instrument, the dial which registers the breaking force was reset to zero. Upon activating the motorized instrument, the jaws were separated at a fixed rate (dial setting of 3.0) until the specimen broke. The motor was then turned off. The breaking force measured on the dial was recorded, and the results for the five strips of each hand sheet were averaged to provide the tensile strengths in pounds per inch indicated in Table II.

TABLE II

Tensile Strengths for Hand Sheets

| Additive | X-Type Zeolite Blend | Y-Type Zeolite |
|---|---|---|
| PVA/Starch | 4–5 | 5 |
| Colloidal silica | NA | 2.5–3.5 |

Commercial-grade papers made by a paper-making machine with these desiccant compositions exhibited the average tensile strengths in pounds per inch indicated in Table III.

TABLE III

Tensile Strengths for Commercial-Grade Sheets

| Additive | X-Type Zeolite Blend | Y-Type Zeolite |
|---|---|---|
| PVA/Starch | 6–7 | 8–9 |
| Colloidal silica | N/A | 3–5 |

The commercial-grade papers generally exhibited higher tensile strengths than hand sheets. This result is expected because a continuous process generates a paper with a more uniform fiber orientation and subjects the paper to calendaring.

Tensile testing also indicated that inorganic binder may be used instead of an organic binder to eliminate the need for a heat curing step in the adsorbent wheel production process. Colloidal silica can be substituted for the organic binders to reduce the content of volatile organics in the final paper without large decreases in dry paper tensile strength. In fact, wet tensile strength and strength at elevated temperatures (i.e., 350° C.) are superior for papers made with colloidal silica when compared with that for papers made with PVA or starch binders.

In Table IV, wet and dry tensile strengths are reported for papers made with no binder, PVA binder and Ludox AM colloidal silica binder after heat treatments of 200° C. and 400° C.

TABLE IV

Tensile Comparison of Paper Made With Binders

| Binder | Tensile Strength at 200° C. (lb./in.) | | Tensile Strength at 400° C. (lb./in.) | |
|---|---|---|---|---|
| | Dry | Wet | Dry | Wet |
| None | 0.31 | 0.19 | 0.31 | 0.23 |
| 5% PVA | 2.49 | 1.36 | 0.80 | 0.58 |
| 10% Ludox AM | 2.61 | 1.91 | 1.23 | 0.73 |
| 15% Ludox AM | 3.90 | 2.30 | 2.03 | 1.06 |
| 20% Ludox AM | 4.29 | 2.40 | 1.99 | 1.40 |

Figure 12:
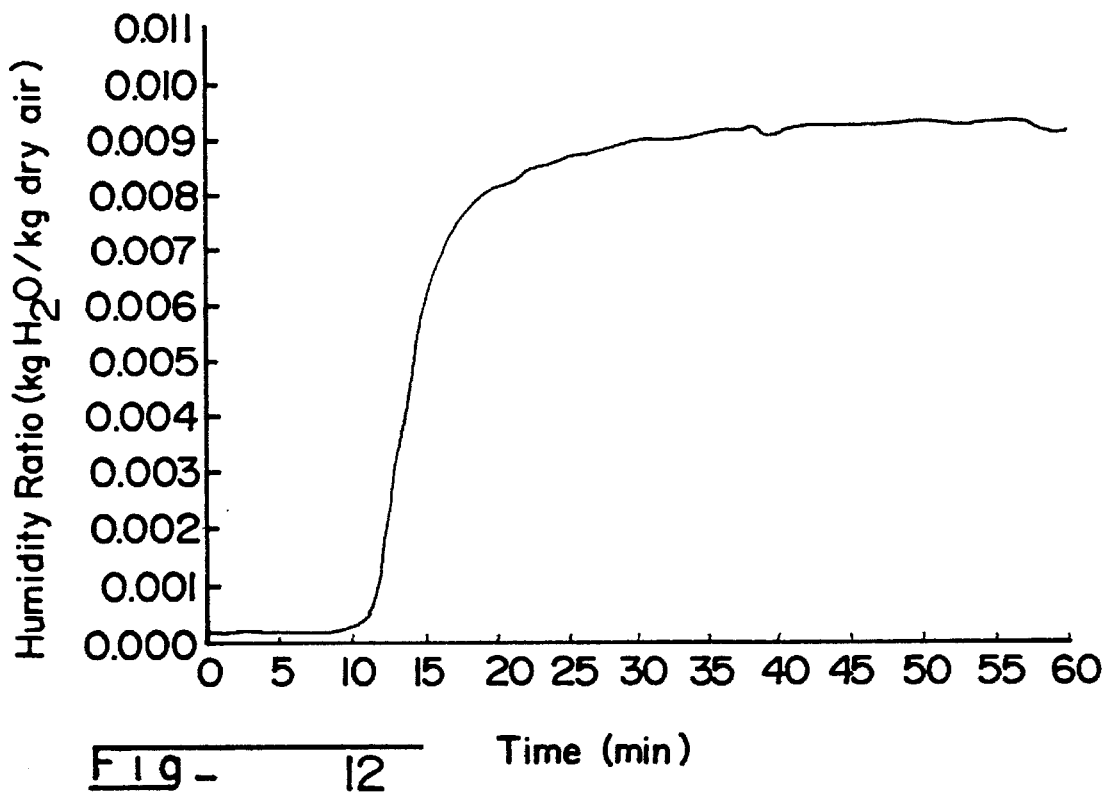
FIG. 12 is a graph showing the dynamic behavior of paper made in accordance with the present invention.
Figure 13:
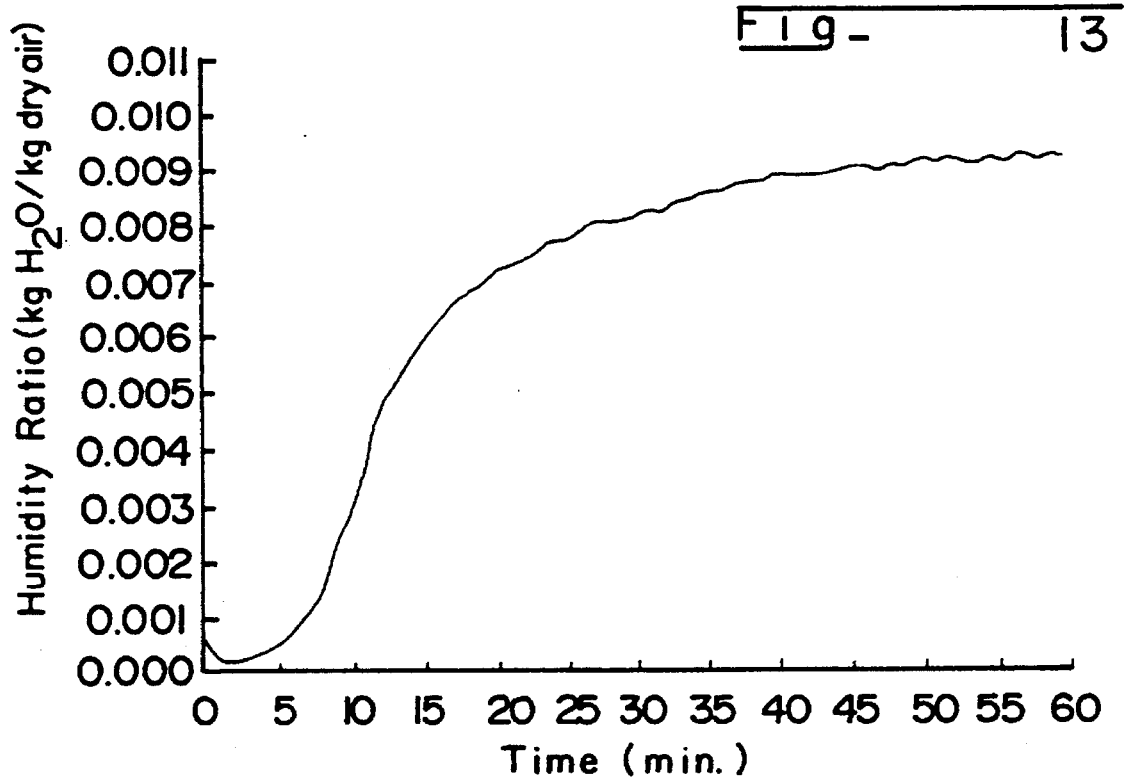
FIG. 13 is a graph showing the dynamic behavior of a core section of a wheel manufactured with a silica gel desiccant composition of the prior art.

Single-faced corrugated paper made from Composite B was likewise subjected to dynamic testing in which laminates were stacked into parallel flow channels in a closed cell of a dynamic test unit. Laboratory air heated to 110° C. was passed through the flow channels of the cell for a period of 4 hours to fully regenerate the desiccant. Then air at 24.5° C. and an inlet humidity ratio of 0.0095 kg water/kg dry air was passed through the cell at a face velocity of 0.58 m/sec and a volumetric flow rate of 0.00156 m$^3$/sec to simulate the conditions experienced in an actual adsorbent wheel. The air exiting the cell was monitored for both temperature and humidity. A moisture profile from the dynamic test after 60 minutes time for Composite B is shown in FIG. 12. Compared with a similar dynamic adsorption test conducted on a core section of a commercially available silica gel wheel as shown FIG. 13, it can be seen that the exit air from Composite B paper is maintained at a significantly lower humidity ratio, and for a longer time period, and that the shape of the adsorption wave front is sharper.

The effect of additives on the paper of the present invention were evaluated using a centrifugal hand sheet former called a Formette Dynamique. The former produces paper similar to paper continuously made by a paper-making machine because the hand sheets have machine and cross direction orientations much like continuously produced paper.

Two sets of hand sheets were prepared and evaluated. The first set of hand sheets were based on a starch/colloidal silica binder system called the COMPOZIL retention system, developed by EKA Noble Inc. The COMPOZIL system comprises 3–6% anionic colloidal silica and 5–8% cationic BMB starch, proportioned according to dry batch of desiccant and fiber. This system works well because it balances the charges on the aramid fiber which is highly anionic and the desiccant which is cationic. Two different types of colloidal silica, Ludox AM from DuPont and BMA-9 from EKA Noble Inc., worked well under evaluation. The starch served as both a binder and as a retention aid for the desiccant powder.

The second system was prepared based on an inorganic colloidal silica system. Alum was added to the inorganic system to provide adequate paper strength and to improve retention. Small amounts of a cationic polyacrylamide polymer was also added to the inorganic system to aid retention.

The fiber furnish was prepared in a Noble and Woods beater at 0.5% consistency. In the cationic starch system experiments, the desiccant powder was added to the fiber slurry. In the inorganic experiments, the desiccant was dispersed as a separate slurry and then combined with the fiber furnish based on the ash content of the slurry. The desiccant used in both systems was US-Y Valfor CBV-500 zeolite from PQ.

The combined fiber-desiccant slurry was diluted to 0.4 to 0.5% consistency and fed into the former from a paddle agitated feed vessel. In the cationic starch system, anionic colloidal silica was added to the thick slurry before dilution and cationic starch added to the diluted stock in the feed vessel. In the inorganic system, the colloidal silica and alum were added to the thick stock before dilution and polyacrylamide retention aids were added to the stock after dilution. A dual retention aid system comprising Hercules 1523 H anionic polyacrylamide and Nalco 7520 cationic polyacrylamide colloidal silica was used to improve retention of the desiccant components in the inorganic system. The system was prepared according to manufacturer's instructions by dilution in water to 0.05 to 2.0% and subjecting it to shear. Substitution of the Hercules 1523 anionic polyacrylamide with alum in the dual retention system further improved retention.

The various fibers evaluated were polyaramid pulp called KEVLAR supplied by DuPont and TWARON supplied by AKZO, one-quarter inch polyaramid fiber called TWARON 1080 supplied by AKZO, and glass micro-fiber, grade 104, with a diameter of 0.5 micrometers.

The glass microfibers manufactured by Schuller Filtration were dispensed in an acidic solution with a pH of about 3 and were added to some of the aramid fibers in various combinations. The addition of glass microfiber is an option which is intended to reduce the cost of forming flat sheets. However, glass microfiber is not preferably used to make corrugated sheets because they tend to crack during corrugation.

Hercules QR-708 rheology modifier was added to the slurry which included TWARON 1080 one-quarter inch polyaramid fiber to promote the dispersion of the aramid fibers. A solution of 1% modifier was added to the beater and again to the thick stock in sufficient quantity to obtain 100 ppm in the water. In one example, Hycar 28064 acrylic latex was evaluated as an additional binder by adding it directly to the beater.

The wet formed sheets were wet pressed in a Baldwin press, 6–10 sheets at a time. The wet pressing cycle was five minutes at 50 psi followed by a second cycle of five minutes at 100 psi. The wet press sheets were dried in a rotary steam heated drum dryer, six minutes for each side for a total of twelve minutes.

Finished sheets were tested for density, caliper, and tensile strength in both the machine direction ("MD") and cross direction ("CD"). These results are presented in Table V for the organic system and in Table VI for the inorganic system.

TABLE V

Organic Binder Systems

| Furnish | Starch Ident. | Starch (%) | BMA-9 (%) | Additional Binder | Binder (%) | Caliper (g/ml) | Density (g/ml) | Tensile (lb/in) MD | Tensile (lb/in) CD |
|---|---|---|---|---|---|---|---|---|---|
| 20% Twaron, 80% Desiccant | BMB-80 | 8.1 | 6 | None | | 10.4 | 0.727 | 6.2 | 4.7 |
| 20% Kevlar, 80% Desiccant | BMB-80 | 3.7 | 1.8 | None | | 13.4 | 0.635 | 5 | 4.3 |
| 10% Kevlar, 10% Long Fiber Twaron 1080, 80% Desiccant | BMB-80 | 6.3 | 4.1 | None | | 10.9 | 0.691 | 15.5 | 11.9 |
| 10% Kevlar, 5% Long Fiber Twaron 1080, 5% Glass 104, 80% Desiccant | BMB-80 | 3.5 | 4.5 | Acrylic | 13.8 | 11.3 | 0.641 | 7.8 | 6.5 |

TABLE VI

Inorganic Binder Systems

| Furnish | Silica Ident. | Silica (%) | Alum (%) | Caliper (mil) | Density (g/ml) | Tensile (lb/in) MD | Tensile (lb/in) CD |
|---|---|---|---|---|---|---|---|
| 20% Twaron, 80% Desiccant | BMA-9 | 3.3 | 8.7 | 16.3 | 0.64 | 1.13 | 1.06 |
| 10% Kevlar, | Ludox | 10.7 | 7.1 | 15.4 | 0.73 | 3.99 | 3.26 |

TABLE VI-continued

| | Inorganic Binder Systems | | | | | | |
|---|---|---|---|---|---|---|---|
| Furnish | Silica Ident. | Silica (%) | Alum (%) | Caliper (mil) | Density (g/ml) | Tensile (lb/in) MD | Tensile (lb/in) CD |
| 10% Long Fiber Twaron 1080, 80% Desiccant | AM | | | | | | |
| 6.7% Kevlar, 6.7% Long Fiber Twaron 1080, 6.7% Glass 104, 80% Desiccant | BMA-9 | 3.1 | 8.3 | 15.7 | 0.67 | 2.09 | 1.94 |

Once the adsorbent paper is produced, it is corrugated by equipment well known in the cardboard container industry. The single-faced composite sheet is produced by laminating a flat liner sheet of adsorbent paper with a fluted sheet of adsorbent paper using an appropriate adhesive i.e. starch, sodium silicate or an acrylic emulsion.

The fluting process consists of feeding a continuous sheet of adsorbent paper between two intermeshed rollers with the flutes running perpendicular to the machine direction. The flute patterns are typical of those in the corrugated container industry. For example, standard E-flute configurations have flute depths of 0.045 to 0.062 inches. The flute tips are rounded to prevent tearing of the paper. Usually, the fluting rolls are heated internally with steam so the paper temperature may reach 250° F. or higher. This process tends to soften the binders and/or fibers during fluting, giving the paper a thermal set (resistance to relaxation). A steam shower maybe used to preheat the paper prior to fluting. Thin, porous papers, exhibiting sufficient tensile strength and elongation have been found to flute more easily with less of a tendency to crack than thicker or denser papers.

As the fluted sheet exits the gap between the two intermeshed rolls, a flat-surfaced roller transfers an adhesive to the tips of the flutes on one face of the paper. The viscosity of the adhesive is important and should be high enough to prevent it from bleeding through the paper and depositing on the heated roll beneath. The susceptibility of bleeding can depend on the porosity of the given paper being corrugated. A second flat continuous sheet of paper entering from a separate alignment roller is then pressed against the fluted sheet providing pressure at the flute tips. The heat from the rolls is sufficient to set the adhesive quickly as it leaves the rolls.

The corrugated sheet is then spirally rolled into a wheel configuration with the flutes lying in the axial direction. This forms open parallel flow channels, providing passage for air. To achieve high-efficiency cooling and dehumidification, equipment pressure drops across the wheel must be kept low, yet heat and mass transfer surface should be maximized. Efforts, therefore, should be made to make the adsorbent paper as thin as possible without losing too much strength. This allows the manufacture of very small laminar flow channels (i.e., 0.062 inches high or smaller), which, in turn, yield improved moisture removal from the air.

It can be beneficial to incorporate an optional spray or dip treatment to the wheel to strengthen the bonds between channels after spiral wrapping, and to provide a smoother channel surface for air flow. Alumina and silica sols, or aluminate and silicate salt solutions (i.e., sodium aluminate or sodium silicate solutions) are suitable for this purpose.

An alumina sol or colloidal dispersion can be prepared by acidification of the alumina with a strong monovalent mineral acid, such as $HNO_3$, HCl, or a strong organic acid, such as formic acid. The acidified sol consists of colloidal particles mostly less than 1 µm in diameter. The pH of the sol preferably is in the 1.0 to 4.5 range.

The viscosity of the sol or solution is a key variable for its application to the base wheel. For a pseudoboehmite sol, a viscosity minimum is observed at a pH of approximately 3.6. The viscosity of the sol generally increases with age. After application, the sol can be gelled by a variety of techniques including accelerated aging by addition of a salt, pH adjustment, or application of heat to reduce the moisture content of the sol. Since the pH of the paper is normally on the basic side, gelling of the sol at the surface will occur rapidly. The sols or neutralized salt solutions, after thermal treatment, enhance the adsorption properties of the wheel.

It may also be beneficial to treat the exterior face of the adsorbent wheel with a temperature-stable epoxy or phenolic resin which after curing provides rigidity to the paper. Thus, the surface can subsequently be ground smooth to provide a durable seal surface in use.

If the wheel contains binders and/or adhesives which decompose at temperatures lower than the expected operating temperature of the regeneration air stream, it may be necessary to remove those binders in a heat treatment process prior to wheel operation. Heat treatment, therefore should be accomplished in either a static process in air where the temperature is very slowly increased to a temperature somewhat higher than the temperature of ultimate use or a flow through process where a sufficiently high air flow is used to accelerate heat and mass transfer. The curing process may be eliminated if inorganic binders and adhesives are used which are generally more resistant to heat. This is also the case for organic binders and adhesives which decompose at a significantly higher temperature than that used for desorption.

In this manner, an adsorbent wheel may be manufactured which is durable, and will not degrade at high regeneration temperatures, while readily adsorbing moisture contained in ambient air, and permitting desorption of the resulting moisture from the wheel during a regeneration cycle of short duration. Such a wheel may readily be deployed as part of a high-efficiency, gas-fired, adsorption cooling system.

While particular embodiments of the invention have been shown and described, it should be understood that the invention is not limited thereto, since many modifications may be made. The invention is therefore contemplated to cover by the present application any and all such modifications which fall within the true spirit and scope of the basic underlying principles disclosed and claimed herein.

What is claimed is:

1. In an air conditioning or dehumidification system wherein a stream of air is adiabatically dehumidified by passing it through an adsorbent wheel or body, the improvement wherein said adsorbent wheel or body is comprised of:
   (a) a synthetic, organic paper support comprised of fibrillated organic fibers; and
   (b) an adsorbent dispersed in said support to provide an adsorbent paper, said adsorbent comprised of one of the group consisting of Y-type zeolite and Y-type zeolite blended with one of the group consisting of silica gel, X-type zeolite and alumina to provide a Y-type zeolite blend, said Y-zeolite and said Y-type zeolite blend selected to have a water sorption isotherm having a Type IM shape and to have an isotherm separation factor in the range of 0.03 to 0.2, said Y-type zeolite selected to have a silica to alumina ratio in the range of 3:1 to 6:1 for adsorption of water from said stream of air during an adsorption cycle and desorption of said water during a subsequent regeneration cycle.

2. An air conditioning system as recited in claim 1, wherein said X-type zeolite comprises a 13-X zeolite.

3. An air conditioning system as recited in claim 1, wherein said paper support is formed from a slurry of fibers and said adsorbent in a paper making process, said paper support being spirally wound to form said wheel.

4. An air conditioning system as recited in claim 3, wherein said fibers are selected from a group consisting of high-density polyethylenes, high-density polypropylenes, aromatic polyamides, polystyrenes, aliphatic polyamides, polyvinyl chlorides, polyesters, rayons, nylons, acrylics, acrylonitrile homopolymers, copolymers with halogenated monomers, styrene copolymers, mixtures of polypropylene with low-density polyethylene, and high-density polyethylene with polystyrene.

5. An air conditioning system as recited in claim 4, wherein said acrylic fibers comprise CFF® fibrillated fibers.

6. An air conditioning system as recited in claim 4, wherein said rayon fibers comprise cellulose acetate fibers.

7. An air conditioning system as recited in claim 1, wherein said fibers comprise aromatic polyamide fibers.

8. An air conditioning system as recited in claim 7, wherein said aromatic polyamide fibers are selected from a group consisting of KEVLAR®, TWARON®, NOMEX®, TEIJINCONEX® and TECHNORA®.

9. An adsorbent wheel as recited in claim 1, wherein the tensile strength of said paper support after drying is at least about 2 lb./inch measured in a cross direction on a sample of at least 10 mils. thick.

10. An adsorbent wheel as recited in claim 1, wherein said silica-to-alumina ratio of said Y-type zeolite is 5.2:1.

11. An adsorbent wheel as recited in claim 1, wherein said adsorbent comprises at least 60% of the total weight of the paper.

12. An adsorbent wheel as recited in claim 1, wherein said adsorbent comprises at least 75% of the total weight of the paper.

13. An adsorbent wheel as recited in claim 1, wherein said paper is fluted and laminated to a flat paper sheet to form laminar flow passage channels in said wheel.

14. An adsorbent wheel as recited in claim 1, wherein said paper further comprises an additive to enhance the strength of said paper.

15. An adsorbent wheel as recited in claim 14, wherein said additive is selected from a group consisting of starch, polyvinyl alcohol, colloidal silica, acrylic latex, alum, and sodium silicate.

16. An adsorbent wheel as recited in claim 1, having a surface of said paper being subjected to an application of a compound selected from a group consisting of an alumina sol, a silica sol, a salt solution of alumina and a salt solution of silica.

17. An adsorbent wheel as recited in claim 1, with an exterior surface of said wheel being subjected to a chemical treatment which provides a hardened coating which is smoothly ground to provide a durable seal surface.

18. An adsorbent wheel as recited in claim 17, wherein said chemical treatment comprises an application of a compound selected from a group consisting of a phenolic resin and a high temperature-stable epoxy.

19. An adsorbent wheel as recited in claim 1, wherein said wheel is nondegradable at temperatures up to 300° C.

20. In an air conditioning or dehumidification system wherein a stream of air is adiabatically dehumidified by passing it through an adsorbent wheel or body, the improvement wherein said adsorbent wheel or body is comprised of:
   (a) a synthetic, organic paper support comprised of fibrillated organic fibers; and
   (b) an adsorbent dispersed in said support to provide an adsorbent paper, said adsorbent comprised of 20–80 wt. % 13-X zeolite, 20–70 wt. % alumina and 0–40 wt. % silica gel to provide an adsorbent blend selected to have a water sorption isotherm having a Type 1M shape and having an isotherm separation factor in the range of 0.03 to 0.2 for adsorption of water from said stream of air during an adsorption cycle and desorption of said water during a subsequent regeneration cycle.

21. In an air conditioning or dehumidification system as recited in claim 20, said adsorbent comprising about 20 wt % 13-X zeolite, about 45 wt % alumina and about 35 wt % silica gel.

22. In an air conditioning or dehumidification system as recited in claim 20, said adsorbent comprising about 34 wt % 13-X zeolite, about 33 wt % alumina and about 33 wt % silica gel.

23. In an air conditioning or dehumidification system as recited in claim 20, said adsorbent comprising about 50 wt % 13-X zeolite and about 50 wt % alumina.

24. In an air conditioning or dehumidification system as recited in claim 20, wherein said alumina is characterized by a pseudoboehmite phase.

25. In an air conditioning or dehumidification system as recited in claim 20, wherein the tensile strength of said paper support after drying is at least about 2 lb./inch measured in a cross direction on a sample of at least 10 mils. thick.

26. In an air conditioning or dehumidification system as recited in claim 20, wherein said fibers are selected from a group consisting of high-density polyethylenes, high-density polypropylenes, aromatic polyamides, polystyrenes, aliphatic polyamides, polyvinyl chlorides, polyesters, rayons, nylons, acrylics, acrylonitrile homopolymers, copolymers with halogenated monomers, styrene copolymers, mixtures of polypropylene with low-density polyethylene, and high-density polyethylene with polystyrene.

27. In an air conditioning or dehumidification system as recited in claim 26, wherein said acrylic fibers comprise CFF® fibrillated fibers.

28. In an air conditioning or dehumidification system as recited in claim 26, wherein said rayon fibers comprise cellulose acetate fibers.

29. In an air conditioning or dehumidification system as recited in claim 20, wherein said fibers comprise aromatic polyamide fibers.

30. In an air conditioning or dehumidification system as recited in claim 29, wherein said aromatic polyamide fibers are selected from a group consisting of KEVLAR®, TWARON® NOMEX®, TEIJINCONEX® and TECHNORA®.

31. In an air conditioning or dehumidification system as recited in claim 20, the adsorbent wheel having a corrugated form to provide channels for fluid flow.

32. In an air conditioning or dehumidification system as recited in claim 20, wherein said paper support further comprises an additive to enhance the strength of said paper.

33. In an air conditioning or dehumidification system as recited in claim 32, wherein said additive is selected from a group consisting of starch, polyvinyl alcohol, colloidal silica, acrylic latex, alum, and sodium silicate.

* * * * *